(12) United States Patent
Cruz-Zeno et al.

(10) Patent No.: US 7,787,613 B2
(45) Date of Patent: Aug. 31, 2010

(54) METHOD AND APPARATUS FOR DOUBLE-TALK DETECTION IN A HANDS-FREE COMMUNICATION SYSTEM

(75) Inventors: Edgardo M. Cruz-Zeno, Round Lake, IL (US); James B. Piket, Gilbert, AZ (US); Tenkasi V. Ramabadran, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 1248 days.

(21) Appl. No.: 11/282,340

(22) Filed: Nov. 18, 2005

(65) Prior Publication Data

US 2007/0121925 A1    May 31, 2007

(51) Int. Cl.
 *H04M 9/08* (2006.01)
(52) U.S. Cl. ................................. 379/406.04
(58) Field of Classification Search .............. 379/406.04
 See application file for complete search history.

(56) References Cited

U.S. PATENT DOCUMENTS

| | | | |
|---|---|---|---|
| 5,687,229 A * | 11/1997 | Sih ........................ | 379/406.09 |
| 6,049,606 A | 4/2000 | Ding et al. | |
| 6,052,462 A | 4/2000 | Lu | |
| 6,141,415 A | 10/2000 | Rao | |
| 6,415,029 B1 * | 7/2002 | Piket et al. .............. | 379/406.04 |
| 2003/0133565 A1 | 7/2003 | Chang | |
| 2004/0062386 A1 | 4/2004 | Tahernezhaadi | |
| 2005/0111655 A1 | 5/2005 | Pan | |
| 2005/0129226 A1 | 6/2005 | Piket | |

FOREIGN PATENT DOCUMENTS

WO     WO0072557 A2     11/2000

OTHER PUBLICATIONS

Supplementary European Search Report Dated Feb. 17, 2010.
PCT Search Report Dated Nov. 2, 2007.

* cited by examiner

*Primary Examiner*—Alexander Jamal
(74) *Attorney, Agent, or Firm*—Terri S. Hughes; Anthony P. Curtis

(57) ABSTRACT

An echo canceling circuit comprising a double talk detector, an upper band signal filter configured to pass only near-end upper band signals to the double talk detector and remove lower band signals, an adaptive filter circuit, a control circuit operatively coupled to the double talk detector and to the adaptive filter circuit, and a threshold estimator configured to iteratively calculate an upper adaptive decision threshold value and a lower adaptive decision threshold value. The double talk detector declares near-end speech to be present if an estimated power level of the upper band signals exceeds the upper adaptive decision threshold value, and declares the near-end speech to be absent if the estimated power level of the upper band signals falls below the lower adaptive decision threshold value for a predetermined number of iterative cycles.

20 Claims, 4 Drawing Sheets

METHOD AND APPARATUS FOR DOUBLE-TALK DETECTION IN A HANDS-FREE COMMUNICATION SYSTEM

FIELD OF THE INVENTION

The present invention relates generally to communication systems, and more specifically, to an acoustic echo cancellation system in a hands-free environment.

BACKGROUND OF THE INVENTION

Echo in a communication system is commonly characterized as the return of a part of a transmitted signal from an end user back to the originator of the transmitted signal after a delay period. As is known in the art, a near-end user transmits an uplink signal to a far-end user. Conversely, the near-end user receives a downlink signal from the far-end user. For example, echo at the near-end occurs when the near-end user originates an uplink signal on an uplink path, and a part of the transmitted signal is reflected back as an echo signal on a downlink path to the near-end. Echo at the far-end occurs when the far-end user originates a downlink signal on the downlink path, and a part of the transmitted signal is reflected back as an echo signal on the uplink path to the far-end. The reflection of the transmitted signal may occur due to a number of reasons, the two primary reasons being 1) impedance mismatch at the four/two wire hybrids of a public switched telephone network (PSTN) exchange resulting in the so-called network or line echo and 2) acoustic coupling between the loudspeaker and microphone of a hands-free telephone resulting in the so-called acoustic echo. An echo signal corresponding to the delayed transmitted signal is perceived as annoying to the end user and, in some cases, can result in an unstable condition known as "howling."

Echo cancellers are required at any echo generating source in an attempt to eliminate or reduce the transmission of echo signals. Echo cancellers may be employed in wireless devices, such as voice capable personal data assistants (PDAs), cellular telephones, two-way radios, car-kits for cellular telephones, car phones and other suitable devices that can move throughout a geographic area. Additionally, echo cancellers may be employed in wireline devices, such as hands-free speaker phones, video and audio conference phones and telephones otherwise commonly referred to in the telecommunications industry as plain old telephone system (POTS) devices. Hands-free speaker phones typically comprise a microphone to produce the uplink signal, a speaker to acoustically produce the downlink signal, an echo canceller to cancel the echo signal and a telephone circuit.

Echo cancellers in a hands-free environment attempt to cancel the echo signals produced at the near-end when the far-end is transmitting by generating echo estimation data corresponding to a portion of a downlink audio signal traveling through the acoustic coupling channel between the speaker and the microphone. The echo canceller models the acoustic coupling channel and in response generates the echo estimation data through the use of an echo canceller adaptive filter. The echo canceller adaptive filter employs modeling techniques using, for example, a finite impulse response (FIR) filter having a set of weighting coefficients adapted using a least mean squared (LMS) algorithm to model the acoustic coupling channel, or other similar modeling techniques known in the art. The echo canceller adaptive filter attempts to subtract the echo estimation data from pre-echo canceller uplink data received by the microphone in order to produce post-echo canceller uplink data. The post-echo canceller uplink data is used by the echo canceller adaptive filter to dynamically update the weighting coefficients of the finite impulse response filter.

A hands-free speaker phone may be integrated into an in-vehicle audio system. The vehicle may be any suitable vehicle, such as an automobile, boat or airplane. The in-vehicle audio system may comprise an amplifier, speakers and an audio source, a CD/DVD player, a tape player, a hard drive playback system, a satellite radio, etc.

Typically, the downlink audio signal received from the far-end through the downlink path is played through at least one speaker in the in-vehicle audio system. The hands-free speaker phone installed in the vehicle, however, may experience significant coupling between the speakers and the microphone. As a result, an amplified downlink audio signal transmitted through the speakers will be partially received by the microphone as an echo signal.

Regarding hands-free telephony systems, as mentioned above, such systems interface to the user at the near-end by means of a loudspeaker and a microphone with minimal or no acoustic isolation between them. The acoustic coupling between the loudspeaker and microphone causes part of the signal received from the far-end, being reproduced by the loudspeaker, to be picked up by the microphone. Left unprocessed, this signal picked up at the microphone would be transmitted to the far-end of the communication system, producing an undesirable echo effect.

Introducing an echo canceller circuit at the near-end of the communication system can eliminate or at least reduce the echo signal before it is transmitted to the far-end. As shown in FIG. 1, known echo cancellers use adaptive filters to estimate the transfer function between the signal reproduced at the loudspeaker and the echo received at the microphone. Once an adaptive filter has an accurate estimate of the transfer function, it is used to filter the signal sent to the far-end loudspeaker to obtain an estimate of the echo signal that is picked up at the microphone. To remove the echo, the estimated echo from the adaptive filter is subtracted from the microphone signal to obtain an echo cancelled signal.

Because the echo path between the loudspeaker and microphone can change frequently, the adaptive filter on an echo canceller must be able to track this changing transfer function continuously. The presence of a near-end signal, however, can affect the adaptation of the filter and cause its estimate to diverge from the transfer function that it is estimating. This causes imperfect cancellation of the echo signal leading to poor performance of the communication system.

To avoid the divergence of the filter coefficients from the optimal values and to improve the performance of the echo canceller, a double-talk detector is often employed. The purpose of the double-talk detector is to determine when the microphone signal comprises not only echo signal from the loudspeaker but also near-end speech. The output of the double-talk detector is then used to slow down or stop the adaptation of the adaptive filter of the echo canceller. Additionally, the output of a double-talk detector can be used in a post-processing stage of the echo canceller, which is used to suppress any residual echo present after the adaptive filter output is subtracted from the microphone signal.

Typical post-processing comprises a non-linear processor (NLP), e.g., a center clipper, to completely remove those parts of a communication signal containing the residual echo. Consequently, when both far-end and near-end speakers are active, i.e., during double-talk, the NLP either passes the residual echo through along with the near-end speech or removes both the residual echo and the near-end speech. Because divergence in the adaptive filter coefficients and incorrect operation of the post-processing functions can have substantial impact on the quality of the echo canceller output, a double-talk detector is a critical part of the echo cancellation system.

Several methods for double-talk detection have been used in the past. Some are based on computing the ratio of power levels of various signals in the communication system. Others are based on computing cross-correlations between various signals in the system. For a description of such methods, please refer to "Acoustic Signal Processing for Telecommunication," edited by Steven L. Gay and Jacob Benesty, Kluwer Academic Publishers (2000), Ch. 5 titled "Double-Talk Detection Schemes for Acoustic Echo Cancellation." While these methods work for network echo cancellation to suppress echoes caused by impedance mismatch in a hybrid circuit, their performance is inadequate for acoustic echo cancellation in a hands-free telephony environment. One reason is that in a hands-free environment, the echo signal level is often much stronger than that of the near-end speech.

Some methods that alter or remove some frequency content from the signal received from the far-end have been introduced, e.g., see U.S. Pat. Nos. 6,052,462 and 6,141,415. To avoid excessive distortion of the received signal, these methods remove the signal energy from a small region of the frequency spectrum before being reproduced by the loudspeaker. At the microphone, the presence or absence of a signal component in the region where the signal energy was removed indicates the presence or absence of near-end speech. Because the frequency region used for detecting near-end speech is usually narrow, some segments of near-end speech may not trigger the detector, which causes the double-talk detector to fail under some conditions.

Another method disclosed in U.S. Pat. No. 6,049,606 exploits the fact that most modern telephony systems carry signals with energy only in the 250-3500 Hz band, but speech signals can contain energy in a wider band, e.g., 0-8000 Hz. By detecting signal energy outside of the standard telephony band, this method can determine the presence of near-end speech without the need to distort the received signal. The method filters the signal from the microphone to remove the telephony band components. The method then compares an estimate of the energy in the out-of-telephony band region with a predetermined threshold to detect the presence or absence of near-end speech. Although more robust than the other methods, this method suffers from a number of drawbacks. First, the use of a predetermined threshold to detect the presence or absence of near-end speech can limit performance, especially when the nature and level of the background noise can vary substantially and continuously in a particular environment, e.g., automobile environment. Second, while useful, the 0-250 Hz portion of the out-of-telephony band has the following limitations: a) the fundamental frequency of some higher-pitched speakers falls outside this region thus rendering this portion practically useless for detection purposes, and b) several background noise types, e.g., car noise, have the highest energy in this frequency range thus lowering signal-to-noise ratios (SNRs), which makes signal detection difficult. Third, several types of speech sounds (phones/phonemes) do not have sufficient energy in the upper band region, i.e., 4-8 kHz portion of the out-of-telephony band, which in combination with a higher-pitched speaker, as discussed above, would cause the detection method to perform poorly. Accordingly, there exists a need for improved double-talk detection performance.

BRIEF DESCRIPTION OF THE DRAWINGS

The features of the present invention which are believed to be novel are set forth with particularity in the appended claims. The invention, together with further advantages thereof, may best be understood by reference to the following description in conjunction with the accompanying drawings.

DETAILED DESCRIPTION OF THE INVENTION

In one embodiment, the present invention provides an echo canceling circuit having a double talk detector, an upper band signal filter configured to pass only near-end upper band signals to the double talk detector and remove lower band signals, an adaptive filter circuit, a control circuit operatively coupled to the double talk detector and to the adaptive filter circuit and an adaptive threshold estimator configured to iteratively calculate an upper adaptive decision threshold value and a lower adaptive decision threshold value. Using a hysteresis loop, the double talk detector declares near-end speech to be present if an estimated power level of the upper band signals exceeds the upper adaptive decision threshold value, and declares the near-end speech to be absent if the estimated power level of the upper band signals falls below the lower adaptive decision threshold value for a predetermined number of iterative cycles.

The present invention further comprises a method for canceling echo signals in a hands-free communications system. The method comprises the steps of filtering near-end speech to provide only upper band signals to a double talk detector, integrating a power level corresponding to the upper band signals and determining a background noise level, iteratively calculating a high adaptive decision threshold value and a low adaptive decision threshold value based on the calculated background noise level, determining in a hysteresis loop whether the near-end speech is present or absent using the high and low decision threshold values, declaring the near-end speech to be present if the estimated power level of the upper band signals exceed the high adaptive decision threshold, and declaring the near-end speech to be absent if the estimated power level of the upper band signals fall below the low adaptive decision threshold for a predetermined number of iterative cycles.

Figure 1:
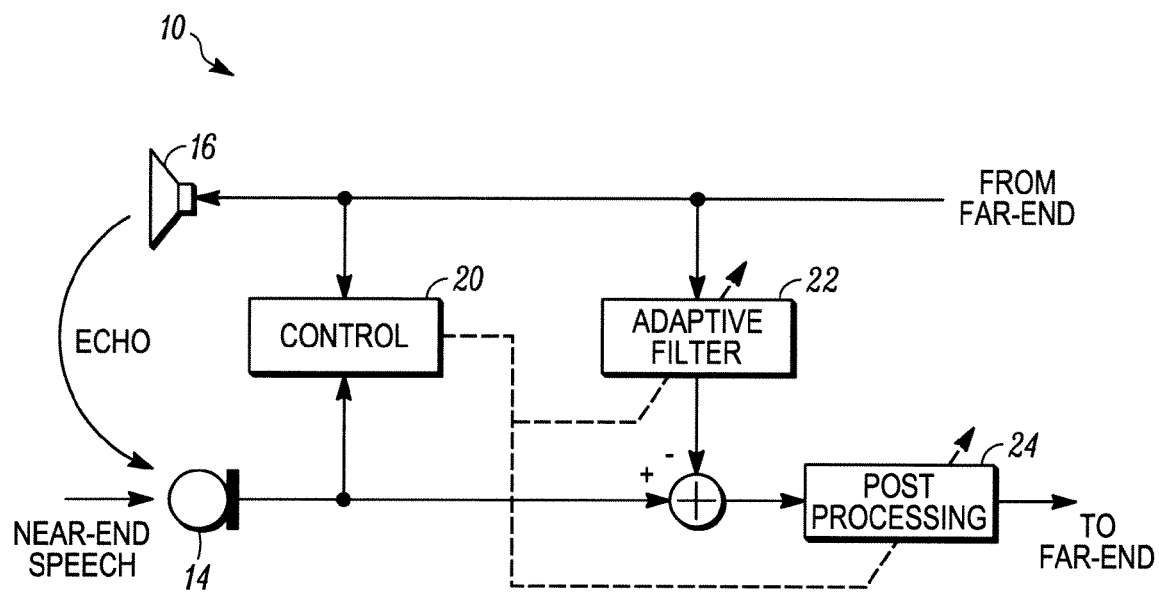
FIG. 1 is a block diagram of a prior art echo cancelling system.
Figure 1A:
FIG. 1A is a pictorial representation of a known communication system.

Let us now refer to the figures to describe the present invention in greater detail. FIG. 1 illustrates a typical prior art echo canceling system 10 that comprises a microphone 14 and loud speaker ("speaker") 16. FIG. 1A also illustrates a known communications environment. The echo canceling components may comprise a control device 20, an adaptive filter 22 and a post processing circuit 24. The components of the known echo canceling system 10 are shown, for example, in the near-end side of the communication system, but may be duplicated in both the near-end and the far-end of the communication system.

Figure 2:
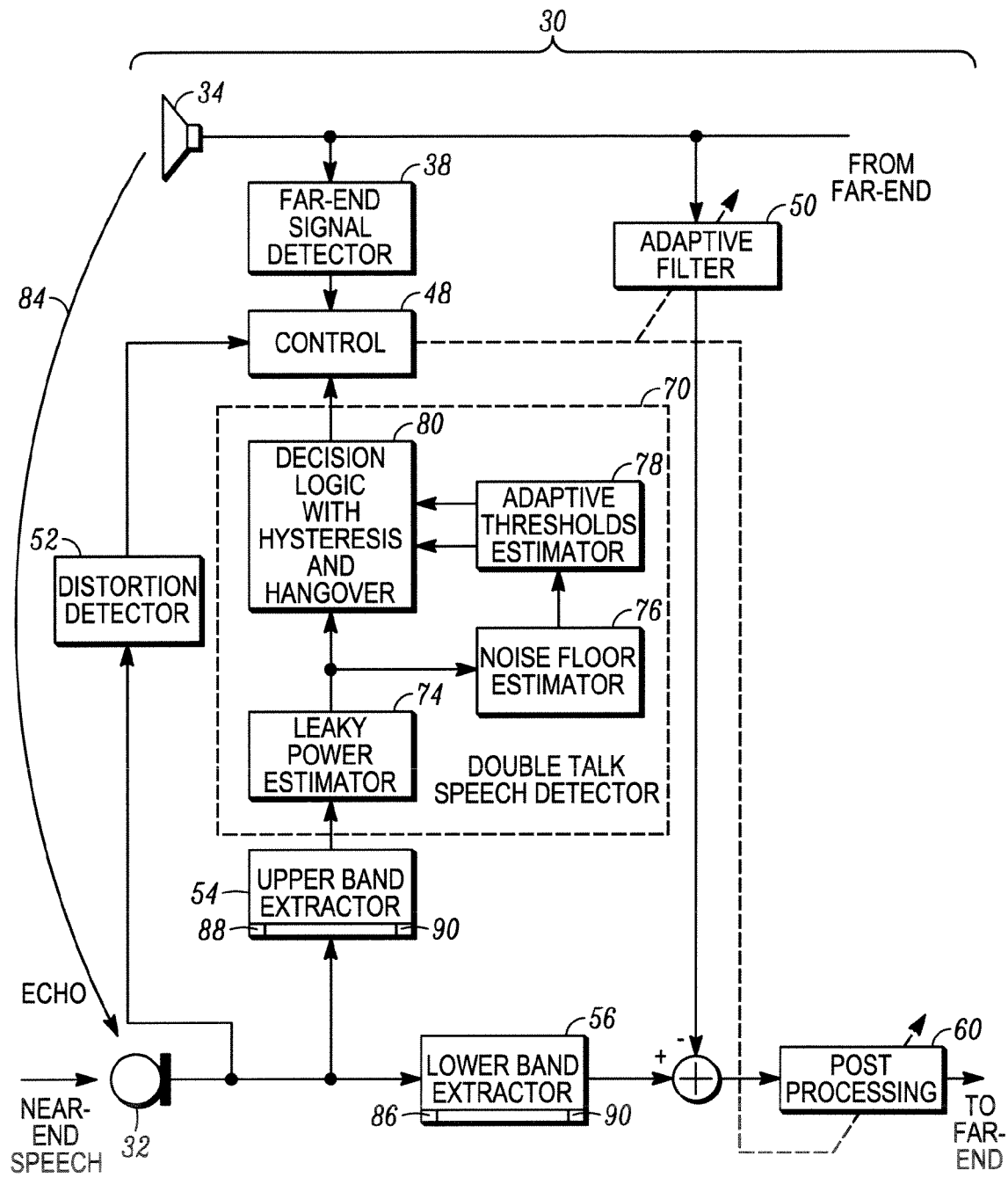
FIG. 2 is a block diagram of an exemplary double-talk detection method according to the present invention.

Referring now to FIG. 2, an example of an echo canceling system 30 is shown. In the present invention, a double-talk detection method and apparatus is described, which utilizes the energy in the out-of-telephony band. Utilizing the energy in the out-of-telephony band provides more robust detection performance than is possible in the prior art systems.

The echo canceling system 30 may comprise a microphone 32 and loud speaker ("speaker") 34. The echo canceling system 30 may also comprise a far-end signal detector 38 to determine if there is a signal being transmitted from a far-end. The echo canceling system 30 may further comprise, control logic 48, an adaptive filter 50, a distortion detector 52, an upper band extractor 54, a lower band extractor 56, a post processing circuit 60, and a double talk speech detector 70. The double talk speech detector 70 may further comprise a leaky power estimator 74, a noise floor estimator 76, an adaptive threshold estimator 78 and decision logic with hysteresis and hangover circuitry 80.

The control circuit 48 may receive input from both the far-end signal detector 38 and the double talk speech detector 70, as well as from the distortion detector 52. When both near-end speech and far-end speech (far-end speech as detected by the far-end signal detector) are present, the control logic 48 may identify a double-talk condition and take appropriate action so that the adaptive filter 50 operates correctly. Note that as mentioned above, a far-end echo canceling system (not shown) may also comprise similar components, and thus for purposes of clarity, only the components of the near-end side are discussed herein.

It is important to note that the far-end signal is limited in bandwidth by the communication system to about 4 kHz or less, and typically between 300 Hz and 3.4 kHz, because the basic communication system provider, such as the telephone network (whether POTS, cellular and the like), is limited to about 4 kHz. Thus, the signals reaching the far-end from the near-end, and conversely, signals reaching the near-end from the far-end, are essentially limited to 4 kHz. Accordingly, the echo signals are also limited to 4 kHz. The limitation of 4 kHz may change or become eliminated altogether as technology advances. The echo signals are shown pictorially by arrow 84 as originating from the near-end speaker 34 and entering the near microphone 32.

The near-end speech signal, however, is not band limited and the microphone 32 at the near-end is of a high quality, so the near-end signal may be sampled, for example, at 16 kHz, to provide a signal having an 8 kHz bandwidth. Thus, additional bandwidth is available to the echo canceling system 30 that is not generally available between the near-end and the far-end. Taking advantage of different bandwidths, the microphone signal may be split into an upper band via the upper band extractor 54, and into a lower band via the lower band extractor 56. The lower band may comprise only frequencies in the range 0-4 kHz, which is currently the limit of the telephone network, while the upper band may comprise only the frequencies in the range of, for example, 4-8 kHz.

The upper band and lower band extractors 54, 56 may comprise an appropriate low-pass filter 86 and high-pass filter 88, respectively, and 2:1 decimators 90, for example. The upper band is used by the double talk speech detector 70, also referred to as "near-end signal detector" or simply as the "double-talk detector," while the lower band signals may be fed into the post processing circuit 60 after echo cancellation by the adaptive filter 50, which essentially provides the output of the echo canceling system to the far-end, subject to various post processing "signal clean up" activities. Because the far-end speech is currently limited to the 0-4 kHz range, the echoes from the far-end speech signal as observed at the microphone 32 at the near-end are also normally band limited to the 0-4 kHz range. The double-talk detector may use the upper band signals to detect any signals not belonging to the echoes 84 of the far-end speech, as only signals in the 4-8 kHz range are passed through to the double talk speech detector 70.

The echo canceling system 30 may detect double-talk conditions using the energy of the upper band signal by determining whether its power has exceeded a particular threshold. In one embodiment, the threshold itself is continuously adapted, meaning that it changes or is modified in response to the background noise level. In that regard, the double talk speech detector 70 may receive the 4-8 kHz signals and may first estimate the power of the signal using the leaky integrator 74 as follows:

$$P[n]=\alpha_p \cdot P[n-1]+(1-\alpha_p)\cdot(x[n])^2 \qquad (1)$$

where x[n] is the upper band signal sample at time index n≧0, P[n] is the signal power (energy per sample) estimate with P[−1]=0, and $\alpha_p$>0 is the leaky integration constant.

The signal power may then be used by the noise floor estimator 76 to estimate a noise floor, (i.e., a background noise level), using a slow rise, rapid decay approach. When the estimated signal power is above the current noise floor estimate, the noise floor estimate may be slowly increased. When the signal energy is below the noise floor estimate, the noise floor estimate may be rapidly decreased to match the current energy estimate from the leaky integrator 74. The estimation of the noise floor is described by the following equation:

$$NF[n] = \begin{cases} \delta_{nf} \cdot NF[n-1]; & P[n] > NF[n] \\ P[n]; & \text{otherwise} \end{cases} \qquad (2)$$

where NF[n] is the noise floor estimate at time index n with NF[−1] set to the maximum expected noise floor level, and $\delta_{nf}$>1 is the noise floor estimation constant.

Once the noise floor estimate is obtained, the adaptive threshold estimator 78 calculates a pair of adaptive decision threshold values used by the decision logic 80 in forming a hysteresis loop, which adaptive decision threshold values may be computed based on the noise floor estimate in accordance with the following formula:

$$T_h[n]=\beta_h \cdot NF[n]$$

$$T_l[n]=\beta_l \cdot NF[n] \qquad (3)$$

where $T_h[n]$ and $T_l[n]$ (with $T_h[n]>T_l[n]$) are respectively the higher and lower adaptive thresholds at time index n, and $\beta_h$>1 and $\beta_l$>1 (with $\beta_h$>$\beta_l$) are respectively the higher and lower threshold estimation constants. It is not necessary that the noise floor and the adaptive decision threshold values be updated for every sample. The adaptive decision threshold values may be updated after every block of 160 samples has been processed, for example, to save computational power. This number may be in any appropriate range depending upon the available computing power and processing speed. For example, the threshold values may be updated or recalculated after between 10 to 200 processing iterations.

Note that portions of the above processes may be carried out in software where various functions may reside in overlapping or different logic blocks relative to the logic blocks shown in the drawings. That is, for example, the process of determining the upper and lower threshold values may be performed by the adaptive threshold estimator 78, or that function may be incorporated as part of the decision logic with hysteresis and hangover 80. The delineation of each function to a specific block is not material, and such functions may be incorporated or performed in related blocks or circuits.

Based on the computed decision threshold values, $T_h[n]$ and $T_l[n]$, and the estimated power P[n], a decision on the presence or absence of near-end speech can be made with hysteresis loop decision logic 80 as follows. If the near-end speech is originally absent, P[n] must exceed $T_h[n]$ before near-end speech is declared to be present. Conversely, if the near-end speech is originally present, then P[n] must fall below $T_l[n]$ before the near-end speech is declared to be absent, subject to the below described conditions.

Although speech energy is usually present in the upper band signals during certain speech sounds, e.g., fricatives, and most speech transitions, the upper band may not have sufficient energy during steady-state segments of certain speech sounds, e.g., nasals. As a result, the near-end speech detector may not work optimally during all conditions, and may declare the near-end speech to be absent during those speech segments that do not have sufficient energy in the upper band. The leaky integrator 74 used to estimate the upper band signal power is helpful in this regard because it does not permit the estimated signal power to drop suddenly when the signal power is low. The leaky integrator 74, however, affects both the rise and fall of the estimated signal power in the same way, and it is not possible to adjust one without affecting the other. Therefore, a "hangover mechanism," which may be part of the decision logic with hysteresis and hangover block 80, may be included to "ride over" or inhibit a change in state of declaring near-end speech to be present during the undetectable portions of the speech signal to enhance the overall detection performance.

Figure 3:
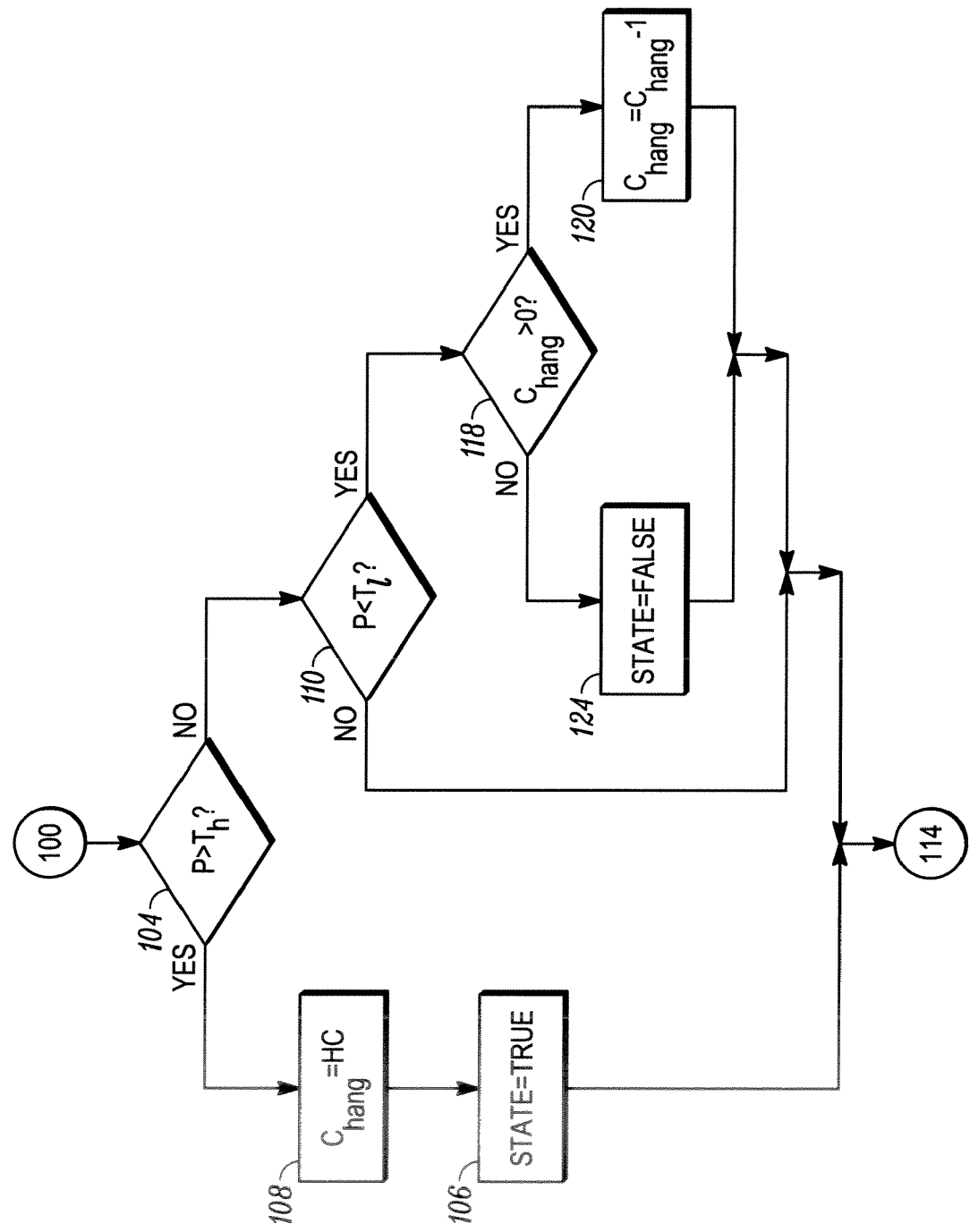
FIG. 3 is a flow chart describing a hangover mechanism according to the present invention.

Referring now to FIG. 3, a flow chart describing the decisional flow of the near-end speech detection logic with the hangover mechanism 80 is shown. As described herein, the term "state" refers to a binary variable indicating the presence (TRUE) or absence (FALSE) of near-end speech. The hangover mechanism is implemented as follows. The process begins at step 100. When the signal power P[n] exceeds the high threshold $T_h[n]$, as shown by a "yes" branch of a decision 104, the near-end speech is declared to be present, as shown in a block 106, and a hang counter $C_{hang}$ is reset to a predetermined positive number HC, as shown in a block 108. Preferably, the value of HC may be about 1200, but any suitable value may be used. For example, the value of HC may range from 20 to 5000.

If the signal power P[n] does not exceed $T_h[n]$, as shown by the "no" branch of the decision 104, process flows to a second decision logic 110. If the signal power P[n] does not fall below $T_l[n]$, as shown by a "no" branch of the decision 110, the near-end signal may or may not be absent, and no definite action is taken. Process flow then exits at a step 114 indicating that the signal power P[n] falls somewhere between the high and low threshold values, and no decision or change in state is declared.

If the signal power P[n] does fall below the low threshold $T_l$, as shown by a "yes" branch of the decision block 110, the "hang counter" is checked to see if it greater than zero, as shown by a decision block 118. If the hang counter is still greater than zero, as shown by a "yes" branch of the decision block 118, the hang counter is decremented by 1, as shown in block 120, and process flow exits at step 114, ready for another iteration.

If, however, the hang counter is not greater than zero, meaning that the value of the hang counter has been decremented from its initial value of HC all the way to zero (i.e., after processing a predetermined HC number of samples), as shown by a "no" branch of the decision 118, the near-end speech is declared absent, as shown by a block 124, and process flow exits at step 114, ready for another iteration.

Figure 4:
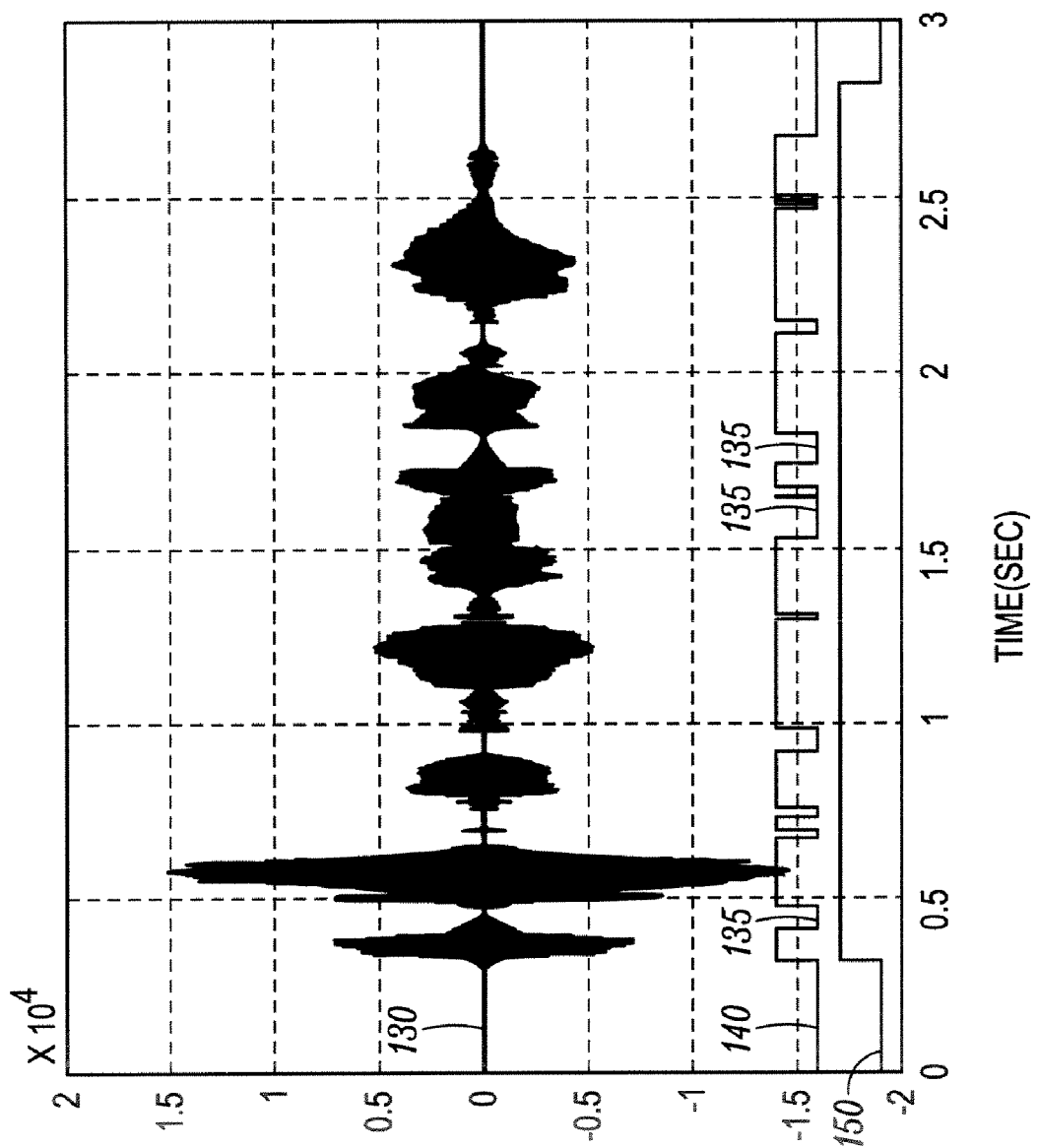
FIG. 4 is a chart illustrating an example speech signal along with the double-talk detector output with or without a hangover mechanism.

FIG. 4 illustrates three graphs showing the effect of the hangover mechanism based upon a speech input signal. The graph labeled as 130 at the top of the figure shows a typical speech signal. In this signal, for example, the pitch frequency exceeds 250 Hz during most of the signal duration, thus making the contribution from the 0-250 Hz portion of the out-of-telephony band quite small.

The graph labeled as 140 toward the lower end of the figure shows the near-end speech detector output without the hangover mechanism, and is illustrated as a digital "on/off" signal. For the purpose of this illustration, the leaky integration constant α of the leaky integrator 74 was chosen as 0.9688, as suggested in U.S. Pat. No. 6,049,606 (modified for 8 kHz signal). It is clearly seen that the detector fails to detect the near-end speech several times, as indicated by the off or zero portions 135 of the signal.

The graph labeled as 150 at the bottom of the figure shows the near-end speech detector output with the hangover mechanism implemented as described above. For the purpose of this illustration, HC (the initial value of the hang counter) was chosen as 1200, which corresponds to about 150 ms. It is seen that the detector is successful in detecting all occurrences of the near-end speech signal in this example. Sometimes, short pauses within the speech signal are also falsely declared as near-end speech. False detections, however, are not as harmful as missed detections, which lead to divergence of the adaptive filter coefficients.

Under normal echo level conditions when only the far-end speaker is active, the near-end speech detector 70 does not detect any speech because there is no energy in the upper band. Under high echo level conditions, however, the microphone signal can be distorted due to clipping and this can cause the echo from the far-end signal to have significant energy in the upper band. Thus, when there is distortion, the double-talk detector may have difficulty determining if the energy in the upper band is due to near-end speech or the distorted high-energy echo. To avoid making false decisions in the presence of distorted signals, the distortion detector 52 may be used. The input to the distortion detector 52 is the microphone signal, and if the level (i.e., absolute value) of this signal exceeds a predetermined threshold $T_{dist}$, the distortion detector may flag the condition. Once the distortion flag is set, it may remain in that condition for a predetermined number of samples $HC_{dist}$ even if the signal level falls below the predetermined threshold $T_{dist}$, which may be similar to the hangover mechanism described earlier.

While the distortion flag is set, the control logic 48 may override the double-talk condition to stop adaptation of the adaptive filter 50, and at the same time, it may apply post processing 60 to attenuate the near-end signal. The decision to halt adaptation and apply post-processing attenuation can be further enhanced by the use of the far-end signal detector 38, which may help distinguish between distortion caused by echo signal and distortion caused by high-energy near-end speech.

Specific embodiments of a method and apparatus for double-talk detection in a hands-free communication system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. For example, the bandwidth limitation on the communication system can be greater than 4 kHz as technology continues to advance. In the same regard, any limitations on the upper and lower bands may also increase/decrease/ or be eliminated as well. It is therefore contemplated to cover by the present invention any and all modifications, variations, or equivalents that fall within the true spirit and scope of the basic underlying principles disclosed and claimed herein.

Moreover, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

What is claimed is:

1. An echo canceling circuit comprising:
   an adaptive filter circuit configured to filter only far-end signals;
   a threshold estimator configured to iteratively calculate an upper adaptive decision threshold and a lower adaptive decision threshold based on a calculated noise level; and
   an upper band signal filter configured to pass only near-end upper band signals,
   wherein near-end speech is declared to be present if an estimated power level of the upper band signals from the upper band signal filter exceeds the upper adaptive decision threshold,
   wherein the near-end speech is declared to be absent if the estimated power level of the upper band signals from the upper band signal filter falls below the lower adaptive decision threshold for a predetermined number of iterative cycles,
   wherein the far-end signals are limited in bandwidth by a communication network traversed by the far-end signals to the echo canceling circuit such that the bandwidth of near-end speech available to the echo canceling circuit is greater than the bandwidth of the far-end signals transmitted via the communication system and the upper and lower band signals are present in near end speech but only the lower band signals are present in the far-end signals, and
   wherein the adaptive filter circuit is adjusted depending on the declaration of the presence of the near-end speech.

2. An echo canceling circuit comprising:
   a double talk detector that contains an adaptive threshold estimator configured to iteratively calculate an upper adaptive decision threshold value and a lower adaptive decision threshold value;
   an upper band signal filter configured to pass only near-end upper band signals to the double talk detector and remove lower band signals;
   an adaptive filter circuit configured to filter only far-end signals; and
   a control circuit operatively coupled to the double talk detector and to the adaptive filter circuit,
   wherein the double talk detector declares near-end speech to be present if an estimated power level of the upper band signals from the upper band signal filter exceeds the upper adaptive decision threshold value,
   wherein the double talk detector declares the near-end speech to be absent if the estimated power level of the upper band signals from the upper band signal filter fall below the lower adaptive decision threshold value for a predetermined number of iterative cycles,
   wherein the far-end signals are limited in bandwidth by a communication network traversed by the far-end signals to the echo canceling circuit such that the bandwidth of near-end speech available to the echo canceling circuit is greater than the bandwidth of the far-end signals transmitted via the communication system and the upper and lower band signals are present in near end speech but only the lower band signals are present in the far-end signals, and
   wherein the adaptive filter circuit is adjusted depending on the declaration of the presence of the near-end speech by the double talk detector.

3. The echo canceling circuit according to claim 2 further comprising a far-end signal detector operatively coupled to the control circuit to determine if far-end speech is received at a near-end.

4. The echo canceling circuit according to claim 3 further comprising a distortion detector configured to detect non-linear distortion of a combination of the near-end speech and far-end/echo signals supplied to the echo canceling circuit, each of the distortion detector and far-end signal detector operatively coupled to the control circuit.

5. The echo canceling circuit according to claim 2 wherein the double talk detector further comprises a leaky integrator configured to estimate a power level of the upper band signals and determine when the estimated power level has exceeded the upper adaptive threshold value, the upper adaptive threshold value continuously adapting depending upon a calculated background noise level.

6. The echo canceling circuit according to claim 5 wherein the double talk circuit further comprises a noise floor estimator to calculate the background noise level.

7. The echo canceling circuit according to claim 6 wherein the integrator is configured to estimate a power level of the upper band signals and determine when the estimated power level exceeds a calculated threshold value.

8. The echo canceling circuit according to claim 7 wherein the upper adaptive threshold value changes based upon the calculated background noise level.

9. The echo canceling circuit according to claim 2 wherein declaring the near-end speech to be present or absent is determined using hysteresis based on the upper and lower adaptive decision threshold values.

10. The echo canceling circuit according to claim 2 wherein calculation of the upper and lower adaptive decision threshold values is based on a calculated background noise level corresponding to the upper band signals.

11. The echo canceling circuit according to claim 2 wherein the upper and lower adaptive decision threshold values are recalculated after between 10 and 200 processing iterations.

12. An echo canceling circuit according to claim 2, wherein the upper band signals are above approximately 4 kHz.

13. An echo canceling circuit according to claim 2, wherein the signal passed to the double talk detector consists of an out-of-telephony band signal.

14. An echo canceling circuit according to claim 2, wherein the echo canceling circuit is adapted for use in a hands-free communications system having a microphone and loud speaker.

15. An echo canceling circuit according to claim 2, wherein a bandwidth of near-end speech signals available to the echo canceling circuit is greater than about 4 kHz and the bandwidth of signals transmitted to and received from the communication system is less than 4 kHz.

16. An echo canceling circuit according to claim 2 further comprising a lower band signal filter configured to pass only the lower band signals to a far-end, the lower band signals comprising near-end speech and/or echo signals.

17. An echo canceling circuit according to claim 2 wherein if the estimated power level of the upper band signals exceeds the upper adaptive decision threshold value, a counter is initialized with a predetermined count value, and if the estimated power level of the upper band signals falls below the lower adaptive decision threshold value for a consecutive number of processing cycles equal to the count value, the near-end speech is declared to be absent.

18. A method for canceling echo signals in a hands-free communications system, the method comprising:
- filtering near-end speech to provide only upper band signals to a double talk detector, the near end speech containing upper and lower band signals;
- integrating a power level corresponding to the upper band signals and determining a background noise level;
- iteratively calculating a high adaptive decision threshold value and a low adaptive decision threshold value based on the calculated background noise level;
- determining in a hysteresis loop whether the near-end speech is present or absent using the high and low decision threshold values;
- declaring the near-end speech to be present if the estimated power level of the upper band signals exceeds the high adaptive decision threshold; and
- declaring the near-end speech to be absent if the estimated power level of the upper band signals falls below the low adaptive decision threshold for a predetermined number of iterative cycles,
- wherein far-end signals are limited in bandwidth by a communication network traversed by the far-end signals to the echo canceling circuit such that only the lower hand signals are present in the far-end signals.

19. A method according to claim 18 further comprising adaptively filtering only the far-end signals and adjusting the adaptive filtering depending on the declaration of the presence of the near-end speech.

20. A method according to claim 19 further comprising:
- detecting the far-end signals to determine if far-end speech is received at the near-end;
- detecting non-linear distortion of the near-end speech; and
- controlling the adaptive filtering dependent on the non-linear distortion and far-end signals detected.

* * * * *

UNITED STATES PATENT AND TRADEMARK OFFICE
CERTIFICATE OF CORRECTION

PATENT NO. : 7,787,613 B2  
APPLICATION NO. : 11/282340  
DATED : August 31, 2010  
INVENTOR(S) : Cruz-Zeno et al.

Page 1 of 1

It is certified that error appears in the above-identified patent and that said Letters Patent is hereby corrected as shown below:

In Column 6, Line 52, in Equation (3), delete "$T_1[n]$" and insert -- $T_l[n]$ --, therefor.

In Column 8, Line 22, delete "$\alpha$" and insert -- $\alpha_p$ --, therefor.

In Column 12, Line 13, in Claim 18, delete "lower hand" and insert -- lower band --, therefor.

Signed and Sealed this
Fourteenth Day of August, 2012

David J. Kappos
*Director of the United States Patent and Trademark Office*